Feb. 1, 1938.      A. TRASK      2,106,775
VALVE
Filed Aug. 10, 1934
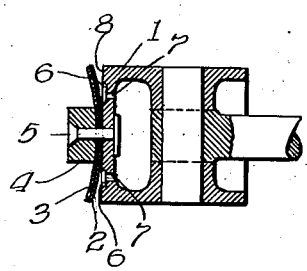
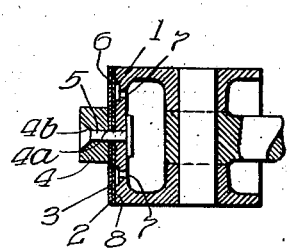
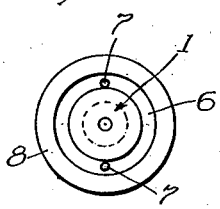
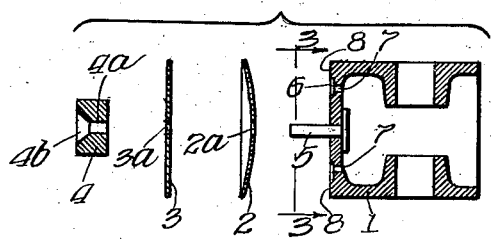
Witness
Harry P. L. White
Inventor
Allen Trask.
By Harvey L. Hanson
Attorney Patented Feb. 1, 1938

2,106,775

UNITED STATES PATENT OFFICE 2,106,775

VALVE

Allen Trask, Chicago, Ill., assignor to Mills Novelty Company, Chicago, Ill., a corporation of Illinois Application August 10, 1934, Serial No. 739,193

8 Claims. (Cl. 230—221)

The invention relates to valves and to the type of valves especially adapted for use in compressors of gaseous fluids. More specifically, the invention relates to suction valves adapted to engage a valve seat on the piston head of a reciprocating compressor.

An object of this invention is to construct an efficient, durable and silent valve.

Another object is to construct a suction valve that will provide for an increase in suction time, and suction portion of the pumping cycle, of the suction valve operation, to gain improved volumetric efficiency in high speed pumps.

A further object of the invention is to construct a valve which will remain unseated until a predetermined compressor speed is reached, whereupon the valve is seated and thus provides automatic loading of the compressor.

An additional object of the invention is the provision of a means to prevent vibration and flutter of a flexible disc valve.

Other objects and advantages of the invention will be in part obvious and in part pointed out hereinafter.

In the drawing that is part of this specification and in which similar reference characters refer to similar parts, Figure 1 shows a cross-sectional view of the flexible valve with its cooperating parts, assembled on a piston head, the valve with dished curvature, being shown in its normal or unseated position;

Figure 2 shows a cross-sectional view similar to Figure 1, except that the valve is shown in its seated position and flat against the piston head;

Figure 3 shows a front elevational view of the valve seat on the head of the piston, and the suction ports through the head of the piston, taken on the line 3—3 of Figure 4;

Figure 4 shows a cross-sectional view of the flexible valve and cross-sectional views of its cooperating parts, unassembled, but in the same relationship as that of the assembly on the piston head, as shown in Figures 1 and 2.

Referring to Figures 1 to 4 inclusive, of the drawing, 1 is a piston upon the head of which valve 2 seats. Valve 2 is a thin disc of spring tempered sheet metal, curved and normally shaped into a dished curvature so that the convex side is toward the piston head. This slight curvature is shown exaggerated in the drawing while in actual practice it may be so slight that in the normal or rest position the valve would be held by its curved shape away from its flat seat only a very slight amount.

A thin dampening disc 3, preferably of spring tempered sheet metal, is secured over valve 2 by valve retaining button 4 and rivet 5. Figure 4 shows the rivet 5 in place in the piston head 1 with its flange within the piston head and prepared to have its stem pass through the aperture 2a of the valve 2 and aperture 3a of the dampening disc 3. After the free end of the rivet stem passes through the apertures 2a and 3a it passes into the aperture 4a in the retaining button 4. It is then headed in the countersink 4b of the retaining button 4 causing the cooperating parts to be firmly assembled and fastened together in position as shown in Figures 1 and 2.

The thin dampening disc 3 is flat in its normal unassembled position as shown in Figure 4, but when assembled as shown in Figure 1, it is pushed by valve 2 into a dished curvature concentric with said valve.

Thus at their centers valve 2 and dampening disc 3 are secured in a firm contact to each other while the outer parts of said members are retained in close contact by the spring tension of valve 2 curved toward the flat dampening disc 3. This contact may be likened to the contact between the leaves of a leaf spring. The friction between the valve 2 and dampening disc 3 induced by their movement in opening or seating prevents a flutter or high frequency vibration of said parts that would tend to cause strain and fatigue of the metal of said parts.

An annular groove 6 in the head of piston 1 provides a passageway for gaseous fluid coming through ports 7 in said piston head. An outer ring 8 of the head of piston 1 provides a seat for the engagement of the peripheral portion of the valve 2.

The normal position or at rest position of the flexible curved valve 2 is an unseated position. This novel and distinctive feature of holding the valve normally off its seat fulfills two very valuable and important objects of this invention, to-wit: The automatic loading of the compressor and the increased volumetric efficiency of the compressor, particularly of the high speed type.

At the start of operation of a compressor incorporating this aforementioned unseated valve construction, the valve will remain off its seat until the compressor has attained sufficient operating speed to cause the valve to close on the compression stroke, by the combined action of the compression stroke of the valve and the force of the fluid inertia of the valve and the force of the fluid being returned back through this valve in the opposite direction while the valve remains unseated during the compression stroke. This provides automatic loading of the compressor, for the compressor will not compress until it has attained sufficient speed to cause the suction valve 2 to seat during the compression stroke.

This increase in pumping efficiency is based on the ability of the valve 2 to allow a greater volume of fluid to enter the compression chamber during the suction portion of the pumping cycle than is allowed by a normally seated valve. This unseated valve construction permits an increased volume to be admitted to compression because the valve is constructed so that it will open sooner and close later than the conventional valves that are retained on their seats in their normal or at rest position.

At the end of a compression stroke and the beginning of a suction stroke of piston 1, the valve 2 will be opened, by the spring tension that makes the open position their natural position, before a fluid flow is induced that would otherwise open them. At the end of a compression stroke valve 2 opens before suction starts on the intake stroke because of the spring tension in valve 2 that keeps it normally in a dished or curved shape off its flat seat. Thus this valve will open earlier in the pumping cycle than valves that are held on their seats by tension until they are lifted by the force of fluid that is drawn in during the suction stroke, and in opening earlier it will allow a larger volume of fluid to reach the compression chamber to be pumped.

At the end of the suction stroke of piston 1, valve 2 will be held open by the spring tension that makes the open position its natural position, until a fluid flow and valve inertia induced by the compression stroke, shall cause them to close. Thus this valve will close only sometime after the beginning of the compression stroke. Since it has to be forced closed against the spring tension that tends to keep it open, it will remain open longer than will the conventional suction valves that are retained on their seats by an induced tension.

This construction that provides for a suction valve remaining open into the first part of the compression stroke results in an increase in volumetric efficiency, particularly in high speed compressors, because the suction time and thus volume is increased much more than the compression stroke length is decreased.

The lag in the closing of this valve takes advantage of the inertia of the inrushing fluid by providing time to include the last of the inlet flow that is induced by the inertia of the fluid itself.

In gasoline engines, and most particularly in high speed gasoline engines, it is common practice to open the intake valves before upper dead center and close them many degrees of angular rotation after the end of the suction or intake stroke.

This timing permits faster engine speeds than could be attained with the use of a shorter timed intake stroke, because the increased time admits an increased charge that obviously contains more latent energy. Likewise the efficiency of a pump employing the valve of this construction is increased because the valve increases the time of suction and the length in angular degrees of the suction portion of the pumping cycle.

The following four interrelated factors determine the structure hereinbefore described: (1) Fluid density, (2) Compressor speed, (3) Valve's resistance to closing, (4) Weight of the valve.

For a given fluid density and compressor speed the definite point in the compression cycle is determined for the valve closing by the absence of fluid flow through the valve. A circular and flexible disc valve is constructed with a slight spherical curvature that positions the valve off its seat. The thickness and diameter of the valve are proportioned to give a ratio between the weight of the free portion of the valve and the force required to seat it, which will cause the valve to seat by its own inertia just at the ideal point in the compression stroke.

As the valve moves with the piston in the compression stroke, it accelerates from zero at the start of the stroke to a maximum acceleration at approximately the first quarter of the stroke. From this point the rate of acceleration decreases until the center of the compression stroke. Here the piston and valve assembly move instantaneously through a point of uniform motion.

Thus, it is seen that for every point in the first quarter of the compression stroke there is a different rate of acceleration. If the intake valve is constructed with a ratio between weight and tension that will allow its inertia to seat the valve by the rate of acceleration at exactly the ideal closing point, then, and then only, may maximum pumping efficiency be had.

A valve structure of this class must for maximum pumping efficiency, have the definite ratio between its weight and tension such that the valve's inertia force induced by acceleration at the ideal closing point will just overcome the tension. This ratio results in a ratio between the valve's thickness and diameter. This is not a ratio of direct proportion, but is instead a square, cube ratio. The valve's tension against seating is proportional to the square of its diameter, and its weight and hence amplitude of inertia, is proportional to the cube of its diameter. Thus any weight-tension ratio may be had.

While being diagrammatically simple, the valve structure of this invention effects a complicated and exact coordination of many factors that become resolved into a definite ratio of thickness to diameter for each combination of speed and fluid density of a high speed pump.

The disc compressor suction valve 2 cooperating with a seat on a piston head as herein disclosed in Figures 1 to 4 inclusive, constitutes a preferred form of construction particularly adaptable to small sized compressors. It is to be understood that other forms might be adopted for reasons of increased size, and so forth, that would incorporate the same purposes and principles that come within the scope of the claims which follow.

What I claim and desire to secure by Letters Patent is:

1. A suction valve assembly for use on a compressor of gaseous fluids comprising a flat valve seat, a flexible disc valve disposed to engage said valve seat, and means for firmly securing a central portion of said disc valve in relation to said valve seat, said valve being of dished formation, whereby to normally maintain the valve in unseated position on the valve seat, the flexibility of said valve being of such degree that the valve will lag in closing on the compression stroke, thereby allowing a greater volume of fluid to enter the compression chamber than would be allowed by a normally seated valve.

2. A suction valve assembly for use on a compressor of gaseous fluids comprising a flat valve seat, a dished flexible disc valve disposed to engage said valve seat when flattened from its normally dished form, and means for firmly securing a central portion of said disc valve in relation to said valve seat, the flexibility of said valve being of such degree that the valve will lag in closing on the compression stroke, thereby allowing a greater volume of fluid to enter the compression chamber than would be allowed by a normally seated valve.

3. A suction valve assembly for use on a compressor of gaseous fluids comprising a flat valve seat, a flexible disc valve disposed to engage said seat, a flexible dampening disc superimposed on said disc valve, and means for securing both said disc valve and said dampening disc in relation to said valve seat, said valve being of dished formation, whereby to normally maintain the valve in unseated position on the valve seat, the flexibility of said valve being of such degree that the valve will lag in closing on the compression stroke, thereby allowing a greater volume of fluid to enter the compression chamber than would be allowed by a normally seated valve.

4. A suction valve assembly for use on a compressor of gaseous fluids comprising a flat valve seat, a dished flexible disc valve disposed to engage said flat valve seat when flattened from its normally curved form, a flexible flat dampening disc superimposed on said disc valve, and means for firmly fixing central portions of both said dampening disc and said valve in relation to said valve seat, the flexibility of said valve being of such degree that the valve will lag in closing on the compression stroke, thereby allowing a greater volume of fluid to enter the compression chamber than would be allowed by a normally seated valve.

5. A suction valve assembly for use on a compressor of gaseous fluids comprising a flat valve seat and a support therefor, a dished flexible disc valve disposed to engage, when flattened, said flat valve seat, a flexible flat dampening disc superimposed on said disc valve, and means for firmly fixing central portions of both said dampening disc and said valve in relation to said valve seat, said means consisting of a rivet secured at one end in said valve seat support, and a rivet button on the side of the disc opposite said support, said rivet extending through said valve and disc and into said rivet button at the other end.

6. A suction valve assembly for a compressor of gaseous fluids including a reciprocating piston, comprising: a flat valve seat formed in the head of said piston, and a normally dished disc of flexible material, the central region of which is firmly secured to the piston head centrally of said seat, and the peripheral region of which is normally curved away from and thereby unseated with relation to said seat, but adapted to flex into gradual seating relation thereto under the combined effect of inertia and fluid impact after the beginning of the compression stroke of said piston.

7. A suction valve assembly for a compressor of gaseous fluids including a reciprocating piston, comprising: a flat valve seat formed in the head of said piston, and a normally dished disc of flexible metal, the central region of which is firmly secured to the piston head centrally of said seat, and the peripheral region of which is normally curved away from and thereby unseated with relation to said seat, but adapted to flex into gradual seating relation thereto under the combined effect of inertia and fluid impact after the beginning of the compression stroke of said piston.

8. A suction valve assembly for a compressor of gaseous fluids including a reciprocating piston, comprising: a flat valve seat formed in the head of said piston, and a disc of thin flexible material, the central region of which is firmly secured to the piston centrally of said seat, the peripheral region of said disc being dished and disposed in normally unseated relation to said seat, but adapted to gradually flex into seating relation thereto under the combined effect of inertia and resistance of said fluid, after the beginning of the compression stroke of said piston, the spacing between said disc and said seat increasing in geometrical progression from the center to the periphery thereof, whereby the area of contact of said disc with said seat during closing movement will expand progressively toward its outer limit, and thereby render said closing relatively noiseless.

ALLEN TRASK.